United States Patent
Rickenbacher et al.

(10) Patent No.: US 8,910,361 B2
(45) Date of Patent: Dec. 16, 2014

(54) METHOD FOR REPAIRING OR RECONDITIONING A BADLY DAMAGED COMPONENT, IN PARTICULAR FROM THE HOT GAS REGION OF A GAS TURBINE

(75) Inventors: Lukas Emanuel Rickenbacher, Basel (CH); Simone Hoevel, Ennetbaden (CH); Adriaan Bernardus Spierings, Wittenbach (CH); Raphael Schmid, St. Gallen (CH); Stefan Buob, Winterthur (CH)

(73) Assignee: Alstom Technology Ltd., Baden (CH)

( * ) Notice: Subject to any disclaimer, the term of this patent is extended or adjusted under 35 U.S.C. 154(b) by 41 days.

(21) Appl. No.: 13/365,282

(22) Filed: Feb. 3, 2012

(65) Prior Publication Data
US 2012/0198676 A1     Aug. 9, 2012

(30) Foreign Application Priority Data
Feb. 3, 2011   (CH) ......................................... 197/11

(51) Int. Cl.
B23P 6/00        (2006.01)
F01D 5/00        (2006.01)
(52) U.S. Cl.
CPC ................. *B23P 6/005* (2013.01); *F01D 5/005* (2013.01)
USPC ...................................... 29/402.13; 29/889.1
(58) Field of Classification Search
CPC ............ B23P 6/00; B23P 6/002; B23P 6/005; F01D 5/005
USPC ............... 29/402.06, 402.07, 402.09, 402.11, 29/402.13, 889.1
See application file for complete search history.

(56) References Cited

U.S. PATENT DOCUMENTS

| 6,215,093 | B1 | 4/2001 | Meiners et al. |
| 6,355,086 | B2 | 3/2002 | Brown et al. |
| 6,811,744 | B2 | 11/2004 | Keicher et al. |
| 7,537,722 | B2 | 5/2009 | Andersson et al. |
| 7,810,237 | B2 * | 10/2010 | Lange et al. ................. 29/889.1 |
| 2003/0105538 | A1 | 6/2003 | Wooten |
| 2004/0031780 | A1 | 2/2004 | Hagemeister et al. |

(Continued)

FOREIGN PATENT DOCUMENTS

| DE | 10219983 A1 | 12/2003 |
| EP | 946325 A1 | 10/1999 |

(Continued)

OTHER PUBLICATIONS

European Patent Office, Examination Report in Swiss Patent Application No. CH 01972011 (May 16, 2011).

(Continued)

*Primary Examiner* — David Bryant
*Assistant Examiner* — Jun Yoo
(74) *Attorney, Agent, or Firm* — Buchanan Ingersoll & Rooney PC (57) ABSTRACT

A method for repairing or reconditioning a damaged component includes working the damaged component by removing a damaged region from the damaged component while creating a cutout corresponding to the damaged region so as to provide a worked component. The worked component is measured and a computer-aided design (CAD) model of a replacement piece based on the measuring and is configured to be inserted into the cutout of the worked component is created. The replacement piece is produced based on the CAD model. The replacement piece and the worked component are connected by joining.

23 Claims, 5 Drawing Sheets

(56) References Cited

U.S. PATENT DOCUMENTS

| | | | |
|---|---|---|---|
| 2007/0084047 A1 | 4/2007 | Lange et al. | |
| 2009/0144980 A1 | 6/2009 | Rangarajan et al. | |
| 2009/0271985 A1* | 11/2009 | Lange | 29/889.1 |
| 2011/0099810 A1* | 5/2011 | Stankowski et al. | 29/888 |
| 2011/0264413 A1* | 10/2011 | Stankowski et al. | 703/1 |

FOREIGN PATENT DOCUMENTS

| | | |
|---|---|---|
| EP | 1358855 A1 | 11/2003 |
| EP | 1620225 B1 | 7/2006 |
| EP | 2070641 A2 | 6/2009 |
| EP | 2317075 A2 | 5/2011 |
| EP | 2317076 A2 | 5/2011 |
| EP | 2347850 A1 | 7/2011 |
| JP | 2007278995 A | 10/2007 |
| JP | 2010207884 A | 9/2010 |
| WO | WO 2004096487 A1 | 11/2004 |
| WO | WO 2008034413 A1 | 3/2008 |
| WO | WO 2008046386 A1 | 4/2008 |

OTHER PUBLICATIONS

European Search Report dated Feb. 29, 2012, issued by European Patent Office in corresponding European Patent Application No. 12152794.9 (10 pgs).

* cited by examiner

METHOD FOR REPAIRING OR RECONDITIONING A BADLY DAMAGED COMPONENT, IN PARTICULAR FROM THE HOT GAS REGION OF A GAS TURBINE

CROSS REFERENCE TO PRIOR APPLICATIONS

Priority is claimed to Swiss Patent Application No. 00197/11, filed on Feb. 3, 2011, the entire disclosure of which is hereby incorporated by reference herein.

FIELD

The present invention relates to the field of working finished components and relates to a method for repairing or reconditioning a badly damaged component, in particular from the hot gas region of a gas turbine.

BACKGROUND

For reasons of good efficiency, gas turbines today have operating temperatures in the hot gas region in excess of 1400° C. It is therefore not surprising that many components of the gas turbines, such as for example moving blades, stationary blades or combustion chamber linings, are exposed to great thermal but also mechanical loads. Since these components are usually produced from expensive high-temperature materials, it is desirable to repair them instead of completely replacing them when they are damaged. In addition, there is often a need to upgrade already installed components, in order to improve their efficiency or adapt them to changing operating conditions.

EP 1 620 225 B1 describes a method for repairing and/or modifying components of a gas turbine in which first at least a portion of the component to be repaired or to be modified is extracted, in particular cut out, from the component. Subsequently, at least the first time this portion of the component is repaired or modified, a data record is created for a replacement part to be produced. The replacement part is then produced by means of a rapid manufacturing process.

After, or even before, the extraction, in particular cutting out, of the particularly damaged portion, and possibly of a tolerance portion adjoining the damaged portion, from the component to be repaired, a data record is created for the replacement part to be produced. In this connection, first a three-dimensional CAD data record is created for the replacement part to be produced. This 3D CAD data record for the replacement part to be produced is subsequently converted into a machine data record. First it is checked whether a 3D CAD data record for the component to be repaired or modified but in the undamaged state or a corresponding new part exists. It is disadvantageous here that an individual distortion (or distortion of a series) cannot be taken into account by the operation. There is always a discrepancy (mismatch) between the actual geometry at the time and the nominal geometry. If such a 3D CAD data record for the undamaged component exists, it is subsequently checked whether firstly there is systematic damage to the component and whether secondly the geometry of the damaged component is reproducible. In the case where there is systematic damage to the component and at the same time the geometry of the damaged component is reproducible, it is possible by taking as a basis statistical evaluations of the size of the damaged portion of the component to be repaired and taking into account during the repair a tolerance portion adjoining the damaged portion, the previously damaged regions of material and greatly stressed regions of the component to deduce the required geometry of the replacement part to be produced and to generate the 3D CAD data record from it.

If, on the other hand, there is no systematic damage to the component to be repaired and/or the geometry of the component that is damaged or to be modified is not reproducible, a reverse engineering of the component, or at least of the relevant regions of the component, is carried out. For carrying out the reverse engineering of the component or component region, first the particularly damaged portion and possibly in addition the tolerance portion adjoining the damaged portion is/are extracted from the damaged component to be repaired. This is followed by performing measurements on the component or component region, for example by mechanical or optical measured-value pick-ups or by computed tomography and subsequent reverse engineering. A 3D CAD data record of the component or component region that is damaged or to be modified, from which the damaged portion and possibly a tolerance portion have previously been extracted, is obtained as a result. From this 3D CAD data record of the worked component or component region, the 3D CAD data record of the replacement part to be produced is determined by establishing the difference in comparison with the 3D CAD data record of the undamaged component.

However, such reverse engineering is altogether very laborious.

WO 2008/034413 describes a method of repair for moving blades of a gas turbine in which a damaged portion of a damaged blade tip is removed by forming a parting surface and then the removed portion is reconstructed on the parting surface by means of a generative process (rapid manufacturing) using three-dimensional CAD structural data of the blade. Such a method of repair entails considerable restrictions concerning the choice of material and the geometry.

WO 2008/046386 describes the building up of a complete gas turbine component by such a rapid manufacturing method.

General methods for creating three-dimensional parts to which reference is made further below in the course of the description are described in, for example, EP 946325, DE 10219983, EP 1358855, U.S. Pat. Nos. 6,355,086, 6,811,744 and 7,537,722.

SUMMARY OF THE INVENTION

In an embodiment, the invention provides a method for repairing or reconditioning a damaged component. The damaged component is worked by removing a damaged region from the damaged component while creating a cutout corresponding to the damaged region so as to provide a worked component. The worked component is measured and a computer-aided design (CAD) model of a replacement piece based on the measuring and is configured to be inserted into the cutout of the worked component is created. The replacement piece is produced based on the CAD model. The replacement piece and the worked component are connected by joining.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 shows in a number of partial figures, 2a to 2e, steps in an exemplary embodiment of the method according to the invention in which the damaged component is scanned only once after introducing the cutout; and FIG. 3 shows in a number of partial figures, 3a to 3e, steps in another exemplary embodiment of the method according to the invention in which the damaged component is scanned in the unworked state and after introducing the cutout.

DETAILED DESCRIPTION

An embodiment of the invention provides a method for repairing or reconditioning a badly damaged component that manages without a parametric CAD model of the component and of the cutout part comprising the damaged region, can be used easily and flexibly and is distinguished by a reduced reject rate.

In an embodiment, the method according to the invention for repairing or reconditioning a badly damaged component, in particular from the hot gas region of a gas turbine, is distinguished by the following steps:
a) working the damaged component by removing the damaged region from the component while creating a corresponding cutout in the component;
b) measuring the worked component provided with the cutout;
c) creating a CAD model of a replacement piece for inserting into the cutout of the worked component;
d) producing the replacement piece in accordance with the created CAD model and
e) connecting the produced replacement piece and the worked component by joining In an embodiment of the invention an individual cutting line is defined for cutting out the damaged region.

According to another refinement of the invention, the removal of the damaged region is performed by a working process. In particular, an EDM process may be used as the working process. However, it is also conceivable to use a milling process as the working process.

In an embodiment, at the same time, to simplify matters, the working process can be carried out without regard for retaining the geometry of a cutout part. In such a case, a complex line can be used as the cutting line.

In an embodiment of the invention the damaged component is likewise measured before the working.

In particular, the measuring may be carried out by means of a mechanically or optically sensing method. A 3D scanning process is preferably used for the measuring.

According to a further refinement, the outer contour of the replacement piece is virtually reconstructed by CAD modeling on the basis of measurement data.

In other cases, it is of advantage if the outer contour of the replacement piece is virtually reconstructed by subtraction of measurement data for the unworked damaged component and measurement data for the worked damaged component.

It is also conceivable that, in the course of the invention, a cutout part is obtained during the working process, and for making further use of its geometry, the cutout part is measured.

In particular, the inner contour of the replacement piece may be virtually reconstructed by using the measurement data of the worked and/or unworked damaged component and/or of a cutout part.

In this connection, it is advantageous if a virtual reconstruction of the replacement piece is created by combining its obtained outer contour and inner contour.

Another refinement of the invention is distinguished by the fact that the CAD model of the replacement piece comprises information concerning the outer contour, the inner structure and cooling air holes on the basis of measurement data.

It is also conceivable within the implementation of the repair that the geometry of the replacement piece is modified by reverse engineering for specific cases of damage or for meeting specific new requirements.

In an embodiment of the invention the replacement piece is produced on the basis of the created drawings or digital models.

According to a further refinement, the replacement piece is produced by casting, a generative process or by a machining process.

The replacement piece is preferably produced by selective laser melting as a generative process.

The replacement piece may, however, also be produced by machining, in particular by milling or electrochemical working.

Furthermore, it is conceivable that the contour of the replacement piece is re-worked to prepare the contact surfaces before the joining.

The re-working of the contour may preferably be carried out by adaptive working in dependence on the required gap tolerance of the joining process and the production tolerance of the replacement piece.

However, it is also conceivable that additional geometrical structures that cannot be created during the production of the replacement piece are created by re-machining of the replacement piece.

According to a further refinement of the invention, the produced replacement piece is connected to the component with a material bond by manual welding or automatic welding or high-temperature brazing or a combination thereof.

The produced replacement piece is preferably connected to the component by high-temperature brazing.

A further refinement of the invention is characterized in that, after the joining of the component and the replacement piece, a re-working of the contour is performed. The re-working is in this case preferably performed by adaptive machining, or adaptively and by machine.

In the case of the proposed method for repairing a removed component, in particular from the hot gas region of a gas turbine, the damaged region is worked by means of methods which make it possible to minimize the loss of material when cutting out the region, which is then replaced by a matching replacement piece. This replacement piece may be produced by a generative production process ("rapid manufacturing process"), such as for example selective laser melting (SLM), selective laser sintering (SLS), electron beam melting (EBM) or standard methods, such as for example a lost-wax method, or a working process, such as for example milling.

Figure 2A:
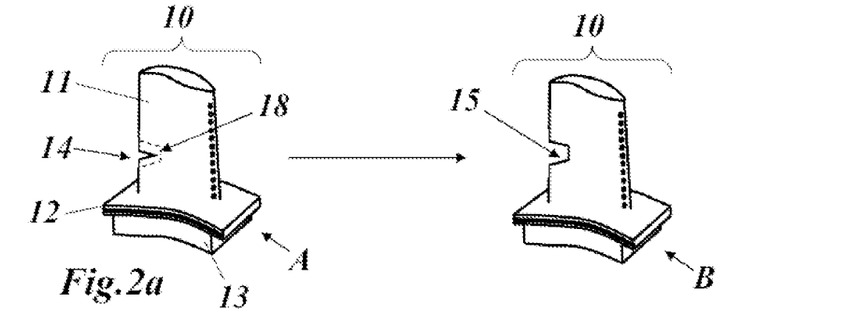
Figure 2B:
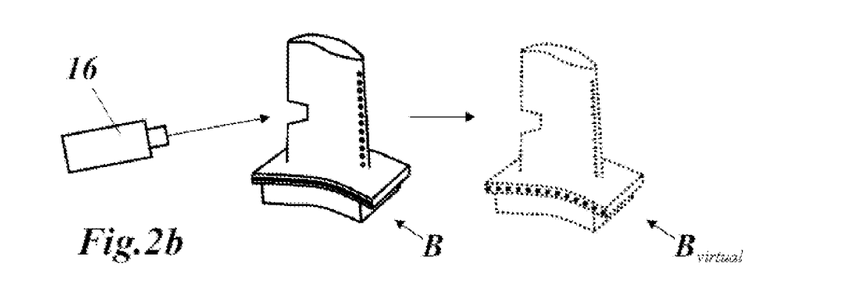
Figure 2C:
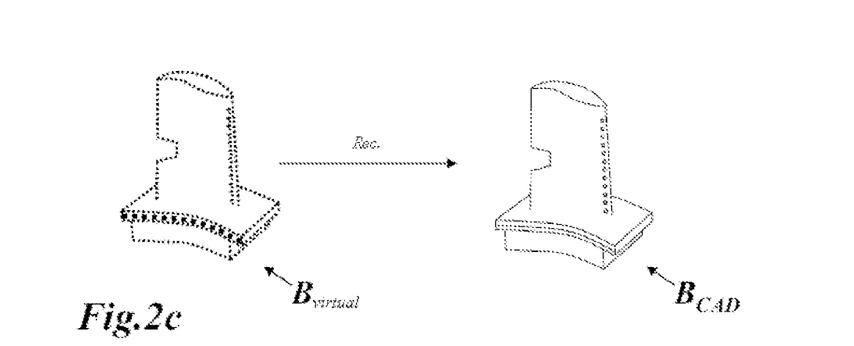

In an advantageous embodiment of the invention (FIGS. 2a-e), the damaged region 14 of the damaged component 10 (A in FIG. 2a), in the example a gas turbine blade with an airfoil 11, a platform 12 and a blade root 13, is removed by a working process (FIG. 2a), which preferably has a negligible influence on the cutting region (no oxidation, small heat affected zone HAZ). After the working process, the worked component 10 (B in FIG. 2a) with the introduced cutout 15 is measured by a mechanically or optically sensing method (scanned with a scanner 16; see FIG. 2b).

Figure 2D:
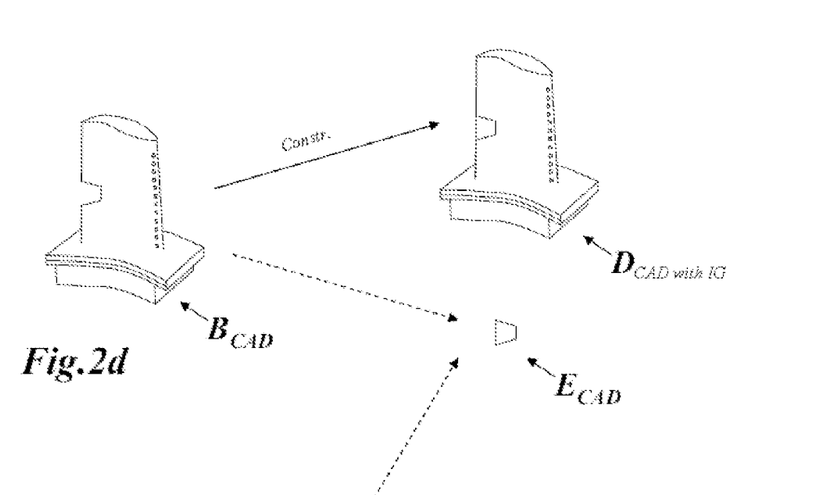
Figure 3A:
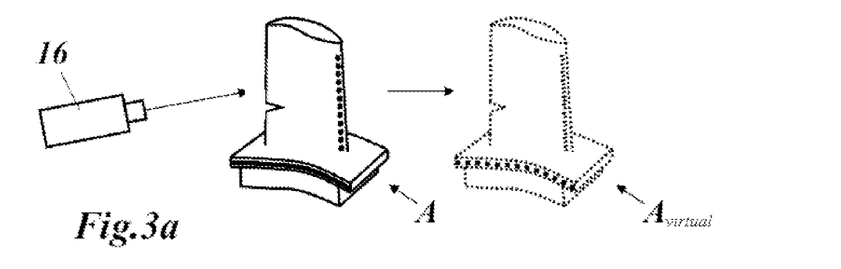
Figure 3B:
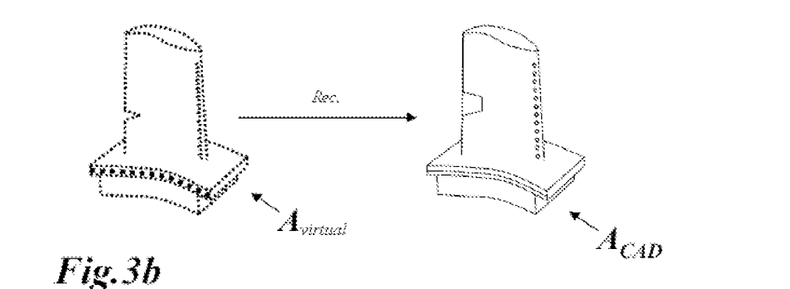
Figure 3C:
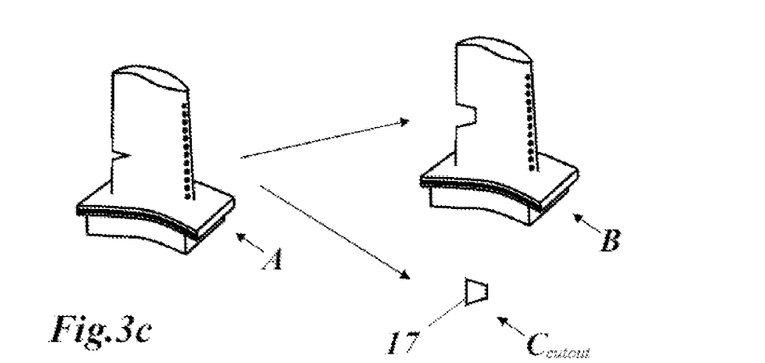

On the basis of the measurement data thereby obtained (virtual worked component $B_{virtual}$ in FIG. 2b), a corresponding CAD model $B_{CAD}$ can be created (FIG. 2c), from which both a CAD model of the component with inner geometry IG $D_{CAD\ with\ IG}$ and a CAD model $E_{CAD}$ of the replacement piece can be derived (FIG. 2d). If the inner geometry IG is very complex, it may, however, also be necessary to scan the cutout cutout part (10 in FIG. 3c) and additionally use the data thereby obtained for the reconstruction.

Figure 2E:
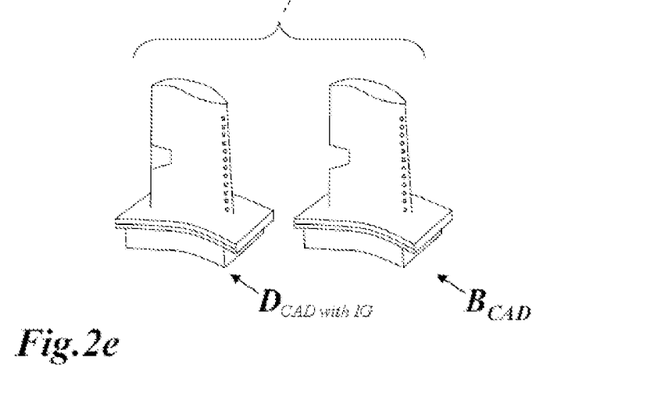

The final CAD data record $E_{CAD}$ of the replacement piece is virtually reconstructed by combining the outer contour and the inner contour of the cutout part, in that the CAD model of the component with the inner geometry IG, $D_{CAD\ with\ IG}$, and the CAD model of the worked component, $B_{CAD}$, are combined with each other (FIG. 2e). Consequently, the resultant geometry data record of the replacement piece includes information concerning the inner surface, possible defects, local changes in the wall thickness and positions of cooling air holes of the removed component.

An additional production tolerance may be added in the region of the parting line to the geometry data record of the cutout part or of the replacement piece. This makes it possible to compensate for the loss of material during the cutting and preparing of the parting line surface and, if necessary, to carry out a final or individual adaptation of a standard replacement piece to the individual removed component to be repaired.

In another embodiment of the invention (FIGS. 3a-e), a badly damaged removed component A is initially measured by a mechanically or optically sensing method (scanned with a scanner 16; see FIG. 3a), before the damaged region is removed by a working process in order to obtain the actual, non-parameterized geometry data of this component at the time. A virtual model is used to define a cutout. A corresponding CAD model $A_{CAD}$ (FIG. 3b) is created on the basis of the measurement data thereby obtained (virtual damaged component $A_{virtual}$ in FIG. 3a) and is used to define a CAD model of damaged component reconstructed with the cutout.

After the scanning, the damaged region is removed by a working process (FIG. 3c), which once again preferably has a negligible influence on the cutting region (no oxidation, small heat affected zone HAZ). This procedure is chosen if there are features in the damaged region that would be lost by the working process.

Figure 3D:
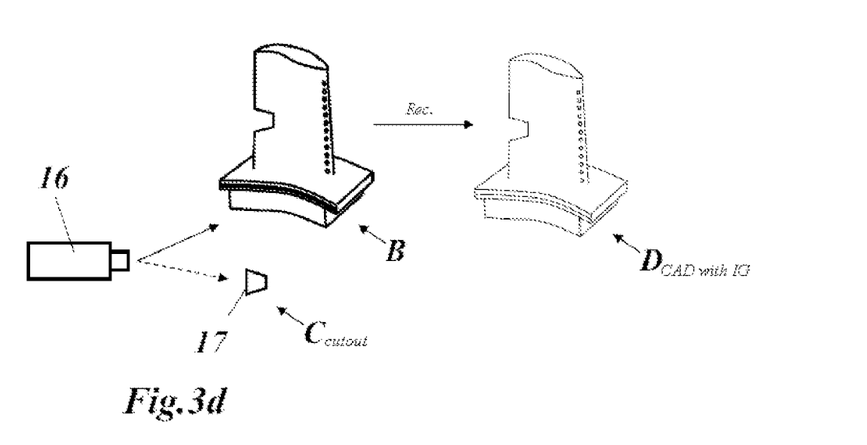
Figure 3E:
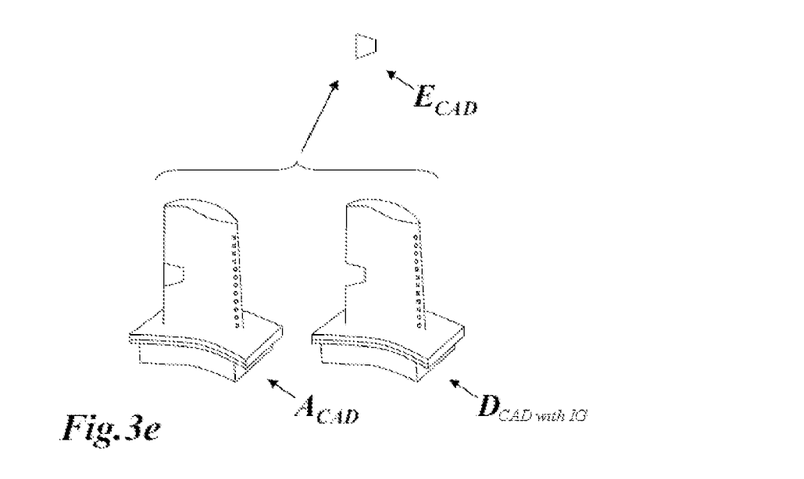

After the working process, the worked component B with the cutout is measured for a second time by a mechanically or optically sensing method (scanned with a scanner 16; see FIG. 3d). On the basis of the measurement data thereby obtained, a corresponding CAD model of the component with inner geometry IG, $D_{CAD\ with\ IG}$, can be created (FIG. 3d). On the basis of the measurement data for the component with and without the damaged region ($A_{CAD}$ and $D_{CAD\ with\ IG}$), a subtraction can be carried out (FIGS. 3e) in order to obtain the outer contour of the replacement piece. The inner contour of the replacement piece is virtually reconstructed, for example by using measurement data of the component with and without the cutout and/or by using measurement data of the removed cutout part $C_{cutout}$ (see broken arrow in FIG. 3d).

The final CAD data record of the replacement piece is virtually reconstructed by combining the outer contour and the inner contour of the cutout part. In this way, the resultant geometry data record of the replacement piece comprises information concerning the inner surface, possible defects, local changes in the wall thickness and positions of cooling air holes of the removed component.

Here, too, an additional production tolerance may be added in the region of the parting line to the geometry data record of the cutout part or of the replacement piece. This makes it possible to compensate for the loss of material during the cutting and preparing of the parting line surface and, if necessary, to carry out a final or individual adaptation of a standard replacement piece to the individual removed component to be repaired.

On the basis of the created geometry data record of the replacement piece, this replacement piece may be produced by a generative production process ("rapid manufacturing process"), such as for example selective laser melting (SLM), selective laser sintering (SLS), electron beam melting (EBM) or laser deposition welding (DMD). Standard methods, such as for example a lost-wax method, or a working process, such as for example milling, may also be used. The decision on the production technology that is used also depends on the degree of damage, the number of pieces and the complexity of the cutout part.

Before the produced replacement piece is connected to the removed component, each replacement piece may be worked in the contour in order to achieve optimum conditions at the parting line surface for the final joining process (for example roughness, gap geometry/gap tolerance). Depending on the procedure selected, the contour working step may be performed by removing a constant thickness or by individual, adaptive working Depending on the working process, other steps apart from the contour working may be necessary prior to joining, such as for example thermal treatments to improve the weldability or stress relief annealing of replacement pieces produced by generative processes.

The joining of the produced replacement piece and the component may be carried out by conventional joining processes, such as for example brazing or welding or a combination of the two. In addition, a subsequent thermal treatment and after-working may be performed at the end of the reconditioning steps performed on the component.

Figure 1:
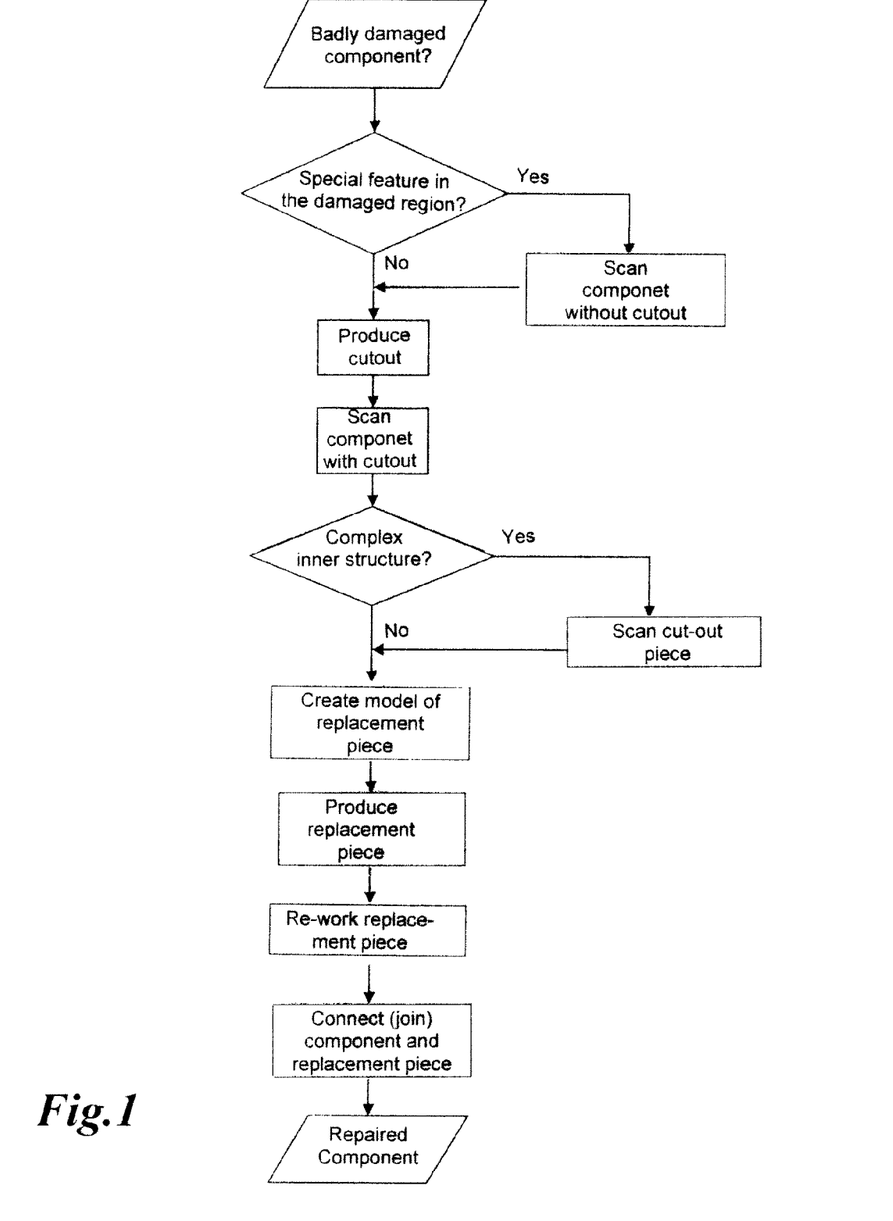
FIG. 1 shows in a flow diagram the sequence of the method according to various exemplary embodiments of the invention.

The various possibilities of the method according to the invention can be summarized in a flow diagram such as that depicted in FIG. 1. The flow diagram represented in FIG. 1 is based on a badly damaged component which has a region with damage 14 (see FIG. 2a). If there are particular features in the damaged region, the damaged component is measured without prior working or without cutting out of the damaged region (cutout). This preferably takes place by a 3D scanning process. If, on the other hand, there are no particular features in the damaged region, the damaged component is subjected directly to said working, a cutout (15 in FIG. 2a) being produced by removing the damaged region.

The thus-worked component with the cutout is in both cases measured (once again by a 3D scanning process) in order to create a corresponding record of measurement data. If the cutout part (17 or $C_{cutout}$ in FIG. 3d) removed from the component has a complex inner structure, this cutout part is likewise measured by scanning If there is no such complex inner structure, a CAD model of the replacement piece is created from the previously determined measurement data and a corresponding replacement piece is produced on the basis of this CAD model.

The replacement piece produced is then re-worked with a view to surfaces suitable for the joining and/or required tolerances or additional properties. The re-worked replacement piece is then connected with a material bond to the worked component by joining, in order finally to obtain a repaired component.

With the method according to the invention, the following properties and advantages are obtained:
  a parameterized CAD model of the component is not required;
  a parameterized CAD model of the cutout part is not required;

characteristic properties of the cutout part and/or information concerning the cutout part on the basis of operational use is/are obtained by the scanning of the removed component and can be systematically evaluated; this makes a statistical evaluation of the patterns of damage and deformation possible, in particular as seen over a prolonged period of time;

the effort involved can be reduced, in that the damaged component is only measured once;

scanning the component twice, before and after the working, makes a better database possible for the virtual reconstruction of the replacement piece;

scanning the component before the working makes it possible to define an individual cutting line and to carry out working on the basis of this measurement data;

the flexibility is improved and the reject rate is reduced;

handling is made easier; and reverse engineering of entire components is not necessary, since no parameterized CAD models are required.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS 10 component (gas turbine blade)
11 airfoil
12 platform
13 blade root
14 damage (damaged region)
15 cutout
16 scanner
17 cutout part
18 cutting line
A damaged component
$A_{virtual}$ virtual damaged component (scanned)
$A_{CAD}$ CAD model of the reconstructed component
B worked component (with cutout)
$B_{virtual}$ virtual worked component (scanned)
$B_{CAD}$ CAD model of the worked component
$C_{cutout}$ cutout part
$D_{CAD\ with\ IG}$ CAD model of the component with inner geometry IG
$E_{CAD}$ CAD model of the replacement piece

What is claimed is:

1. A method for repairing or reconditioning a damaged component comprising:
   measuring the damaged component to provide pre-removal measurement data of the damaged component;
   working the damaged component by removing a damaged region from the damaged component while creating a cutout corresponding to the damaged region so as to provide a worked component;
   measuring the worked component;
   creating a computer-aided design (CAD) model of a replacement piece based on the measuring of the damaged component and the measuring of the worked component, the replacement piece being configured to be inserted into the cutout of the worked component;
   producing the replacement piece based on the CAD model;
   connecting the replacement piece and the worked component by joining,
   wherein the measuring of the worked component includes providing worked component measurement data, and wherein the creating of the CAD model includes virtually reconstructing an outer contour of the replacement piece by subtracting the worked component measurement data from the pre-removal measurement data.

2. The method as recited in claim 1, wherein working includes removing the damaged region from a hot region of a gas turbine.

3. The method as recited in claim 1, further comprising:
   defining an individual cutting line about the damaged region prior to the removing.

4. The method as recited in claim 3, wherein the individual cutting line is a complex line.

5. The method as recited in claim 1, wherein the working is performed using an electrical discharge machining (EDM) process.

6. The method as recited in claim 1, wherein the working is performed using a milling process.

7. The method as recited in claim 1, wherein the working is performed without retaining a geometry of a cutout of the cutout part.

8. The method as recited in claim 1, wherein the measuring of the damaged component is performed using at least one of a mechanical and an optical sensing technique.

9. The method as recited in claim 8, wherein the measuring of the damaged component is performed using a 3D scanning process.

10. The method as recited in claim 1, wherein the working includes obtaining a cutout part of the cutout and measuring the cutout part so as to determine a geometry of the cutout part.

11. The method as recited in claim 10, wherein the creating of the CAD model includes virtually reconstructing an inner contour of the replacement piece using at least one of the worked component measurement data, the pre-removal measurement data, and the geometry of the cutout part.

12. The method as recited in claim 11, wherein the creating of the CAD model includes virtually reconstructing the replacement piece by combining the outer contour and the inner contour.

13. The method as recited in claim 1, wherein the producing of the replacement piece is based on one of a created drawing and a digital model.

14. The method as recited in claim 1, wherein the producing of the replacement piece is performed using at least one of casing, a generative process and a machining process.

15. The method as recited in claim 14, wherein the generative process includes selective laser melting.

16. The method as recited in claim 14, wherein the machining process is performed using at least one of milling and electrochemical working.

17. The method as recited in claim 1, further comprising:
   re-working a contour of the replacement piece to prepare a contact surface before the joining.

18. The method as recited in claim 17, wherein the re-working is performed using adaptive working depending on a required gap tolerance of the joining and a production tolerance of the replacement piece.

19. The method as recited in claim 18, wherein the re-working includes creating geometrical structures that cannot be created during the producing using re-machining of the replacement piece.

20. The method as recited in claim 1, wherein the connecting of the replacement piece and the worked component is performed using at least one of manual welding, automatic welding and high-temperature brazing with a material bond.

21. The method as recited in claim 1, further comprising:
re-working a contour of at least one of the worked component and the replacement piece after the connecting by joining.

22. The method as recited in claim 21, wherein the re-working is performed using at least one of adaptive machining and machining.

23. The method as recited in claim 1, wherein the measuring of the worked component includes measuring an inner geometry of the worked component.

* * * * *